(12) United States Patent
Dawes et al.

(10) Patent No.: US 6,843,076 B2
(45) Date of Patent: Jan. 18, 2005

(54) SINGLE STEP LAYDOWN METHOD OF MAKING DRY FIBER WITH COMPLEX FLUORINE DOPED PROFILE

(75) Inventors: Steven B. Dawes, Corning, NY (US); Michael T. Murtagh, Horseheads, NY (US); Pushkar Tandon, Corning, NY (US)

(73) Assignee: Corning Incorporated, Corning, NY (US)

( * ) Notice: Subject to any disclaimer, the term of this patent is extended or adjusted under 35 U.S.C. 154(b) by 241 days.

(21) Appl. No.: 09/918,088

(22) Filed: Jul. 30, 2001

(65) Prior Publication Data

US 2003/0046960 A1 Mar. 13, 2003

(51) Int. Cl.$^7$ ............................................ C03B 37/018
(52) U.S. Cl. ............................. 65/391; 65/392; 65/415; 65/416; 65/421; 65/422; 65/425; 65/426; 65/427; 65/429
(58) Field of Search .......................... 65/327, 429, 397, 65/415, 416, 421, 422, 425, 426, 427, 391, 392

(56) References Cited

U.S. PATENT DOCUMENTS

| | | | | |
|---|---|---|---|---|
| 4,453,961 A | | 6/1984 | Berkey | 65/312 |
| 4,486,212 A | | 12/1984 | Berkey | 65/2 |
| 4,525,189 A | * | 6/1985 | Ohmi et al. | 65/3.15 |
| 4,629,485 A | | 12/1986 | Berkey | 65/3.11 |
| 4,812,153 A | * | 3/1989 | Andrejco et al. | 65/3.12 |
| 4,968,339 A | | 11/1990 | Miller et al. | 65/3.12 |
| 5,556,442 A | * | 9/1996 | Kanamori et al. | 65/17.4 |
| 5,917,109 A | | 6/1999 | Berkey | 65/412 |
| 6,474,107 B1 | * | 11/2002 | Dabby | 65/397 |
| 2002/0005051 A1 | | 1/2002 | Brown et al. | 65/414 |

* cited by examiner

Primary Examiner—Peter Chin
(74) Attorney, Agent, or Firm—Price, Heneveld, Cooper, DeWitt & Litton; Randall S. Wayland

(57) ABSTRACT

A method of making an optical waveguide preform includes forming a preform including a first portion and a second radial portion, wherein the second portion includes a dopant, and wherein the first portion exhibits a density greater than the second portion. The method further includes stripping at least a portion of the dopant from the second portion. In a preferred embodiment, the stripped dopant has migrated in a previous processing step.

43 Claims, 3 Drawing Sheets

SINGLE STEP LAYDOWN METHOD OF MAKING DRY FIBER WITH COMPLEX FLUORINE DOPED PROFILE

BACKGROUND OF THE INVENTION

1. Field of the Invention

The present invention relates generally to the manufacture of optical waveguide fibers, and in particular to manufacturing a fluorine doped preform from which an optical fiber may be drawn.

2. Technical Background

Optical fibers having a fluorine doped region have unique attributes for long haul optical fibers, dispersion compensating optical fibers, dispersion slope compensating optical fibers, and high data rate optical fibers. The ability to include fluorine in an optical waveguide preform is an important aspect of producing an optical fiber with a fluorine doped region.

Prior attempts to incorporate fluorine into a preform include depositing fluorine doped soot on a starting member or bait rod. Typically, the starting member is a sintered core cane. One of the drawbacks of this approach is that the deposited fluorine exhibits significant migration from the region or regions of interest and migration into areas not intended to include the dopant. Preforms fluorinated during deposition have also exhibited a fluorine loss of between forty percent (40%) to fifty percent (50%) during consolidation. One reason for the low retention rate of fluorine is the production of the compound $SiF_4$ during deposition. Typically, $SiF_4$ generated during deposition will volatilize from the preform during consolidation. As a result, the time of consolidation must be extended in an effort to redope the preform with $SiF_4$.

The relatively long times at the relatively low temperatures of the slow ramp consolidation impact fluorine retention in at least two ways: (1) the fluorine containing vapor (mainly $SiF_4$) evolving from the soot has sufficient time to diffuse out of the preform; and (2) the equilibrium of redoing the preform with $SiF_4$ vapor is not a favored reaction at the lower temperatures and low ramp rates. Thus, deposition of fluorinated soot with a redoing step has not proven to be effective.

Fluorine may also be added to a soot preform during a consolidation doping step as taught in Berkeley U.S. Pat. No. 4,629,485. In one such consolidation doping process, soot is deposited on a core cane forming a physical interface between a central core region of the optical fiber and the soot region. The soot coated, core cane is dried in a 2% chlorine containing atmosphere for approximately 2 hours at 1000° C. The dried preform is then exposed to a fluorine containing atmosphere for 1–4 hours at a temperature of between 1100° C. and 1400° C. The fluorine doped preform is then fully sintered. Subsequently, the preform is drawn into an optical fiber. This method adds unnecessary time and steps to the manufacturing of the preform, as well as additional costs thereto.

While doping has been demonstrated during the consolidation process, fluorine doping during lay down is preferred as it is possible to make more complex profiles in a reduced number of steps. As noted above, fluorine doping during laydown is plagued with the problem of fluorine migration into areas where fluorine doping is not intended. The use of glass barrier layers has been used to prevent the migration of fluorine. However, the use of glass barrier layers on both sides of a fluorine doped region may cause water to be trapped within the contained layer. Any water within the contained layer that cannot be removed using conventional drying procedures, i.e., since it is trapped between the glass barrier layers, may lead to an unacceptably high attenuation within the resultant optical fibers.

A need exists for alternative methods to produce preforms having at least one fluorine doped region which does not exhibit significant migration of fluorine in the preform or high attenuation in the fiber.

SUMMARY OF THE INVENTION

This invention meets the need for a method for producing preforms having at least one fluorine doped region which does not exhibit significant signal loss via attenuation, and eliminates the detrimental effects of fluorine migration.

One embodiment of the present invention is to provide a method for manufacturing an optical waveguide preform including forming a preformed body including a first portion and a second portion, wherein the second portion includes a dopant, and wherein the first portion exhibits a density greater than the second portion. The method further includes stripping at least a portion of the dopant from at least a section of the second portion.

Another embodiment of the present invention is to provide a method for manufacturing an optical fiber preform including forming a preform body including a moat and a radial portion abutting the moat, wherein the portion includes a fluorine dopant. The method further includes stripping substantially all of the fluorine dopant from the radial portion.

In addition, embodiments of the methods disclosed herein include applying heat to a portion of the preform body, thereby forming a glass barrier between two regions of the preform, drying certain radial portions or regions of the preform with a drying agent, partially sintering the portions prior to the stripping step, and stripping the dopant from a particular portion via a stripping agent.

Reference will now be made in detail to the present preferred embodiments of the invention, examples of which are illustrated in the accompanying drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

It is to be understood that the foregoing description is exemplary of the invention only and is intended to provide an overview and an understanding of the nature and character of the invention as it is defined in the claims. The accompanying drawings are included to provide a further understanding of the invention and are incorporated and constitute part of the specification. The drawings illustrate various features and embodiments of the invention which, together with their description, serve to explain the principles and operation of the invention.

Figure 1:
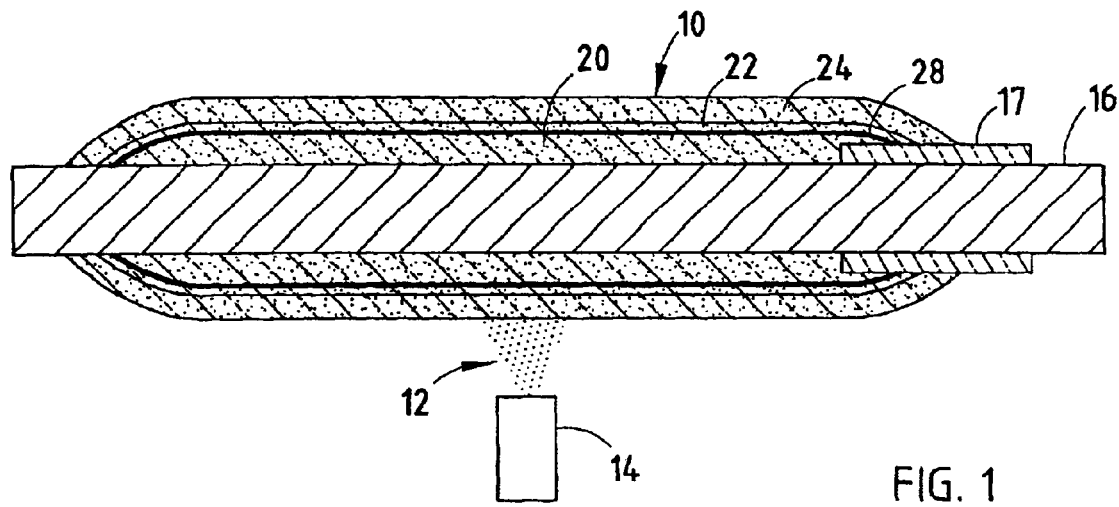
FIG. 1 is a cross-sectional schematic view of an optical waveguide preform embodying the present invention and a soot producing burner.

A soot preform 10, as shown in FIG. 1, is formed from a Chemical Vapor Deposition ("CVD") process. It should be noted that preform 10 can be formed by various CVD processes such as Outside Vapor Deposition ("OVD") process, Vapor Axial Deposition ("VAD") process, a Modified Chemical Vapor Deposition ("MCVD") process, and a Plasma Chemical Vapor Deposition ("PCVD") process. In the example illustrated in FIG. 1, an amount of soot 12 is deposited via an OVD process, from a burner 14 onto a starting member or bait rod 16 and a glass handle 17 to form preform 10, and is preferably formed in a single deposition step.

Figure 2:
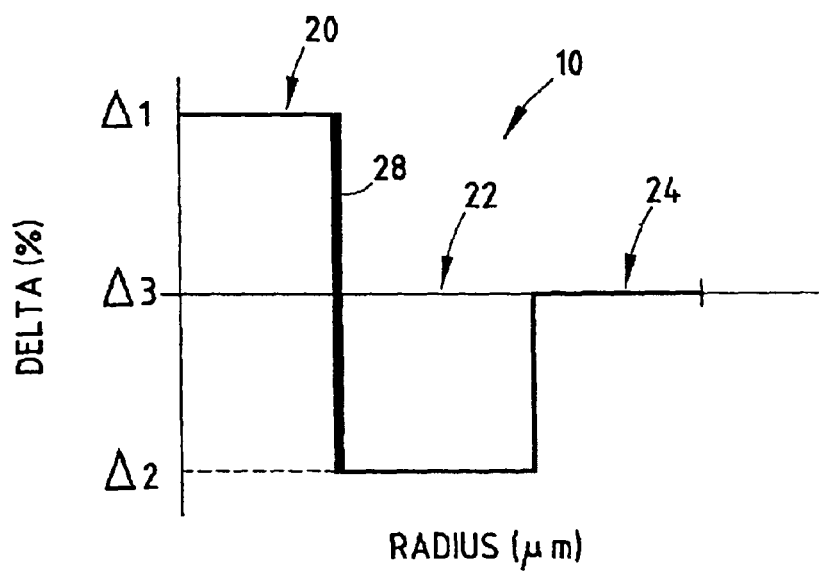
FIG. 2 is a diagram of an optical fiber refractive index profile constructed from the preform, wherein the preform does not exhibit migration.

Preferably, the soot 12 being deposited onto starting member 16 is a silica based soot. More preferably, preform 10 may have one or more regions of doped silica soot. Dopants utilized within the regions of preform 10 include, but are not limited to, Ge, P, Al, B, Ga, In, Sb, Er, Li, Na, K, Rb, Cs, Be, Mg, Ca, Sr, Ba, Ti, Se, Te, Fr, Ra, Bi, or combination thereof. Preform 10 may also have one or more regions of undoped silica soot. In the present example, it is most preferred that an outer region of preform 10 comprises undoped silica soot. In one preferred embodiment, preform 10 includes a first region or portion 20, a second region or radial portion 22 surrounding first region 20, and a third region or radial portion 24 surrounding second region 22. The refractive index profile of an optical waveguide fiber constructed form preform 10 is shown in FIG. 2. In the present example, preform 10 is formed by depositing first region 20 of silica soot doped with a refractive index decreasing dopant, such as germanium (e.g., having a $\Delta_1$), depositing second region 22 of silica soot doped with a refractive index increasing dopant such as fluorine (e.g., having a $\Delta_2$), and depositing third region 24 of pure silica soot (e.g., having a $\Delta_3$). The refractive index profile of the present example generally follows the relationship of $\Delta_1 > \Delta_3 > \Delta_2$, however, other profiles may be constructed utilizing the concepts disclosed herein.

Figure 3:
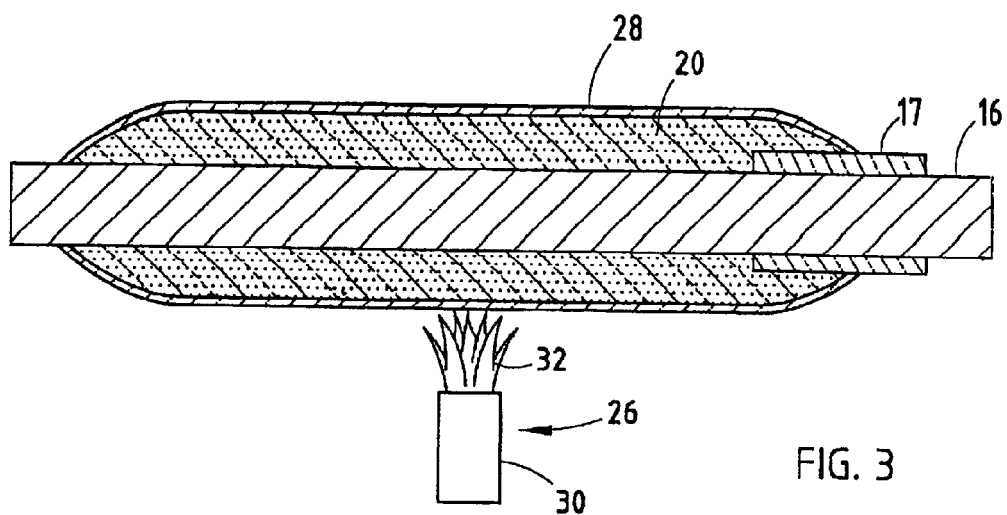
FIG. 3 is a cross-sectional schematic view of the preform and a heat source.

Prior to depositing the soot of second region 22, the method includes applying heat from a heat source 26 (FIG. 3) to an outer surface of first region 20, thereby "fire polishing" or forming a glass barrier layer 28 that radially surrounds first region 20. Heat source 26 includes a burner system 30 that generates a flame 32 by combusting fuels including, but not limited to, oxygen, methane and oxygen, carbon monoxide and oxygen, deuterium, hydrogen, and combinations thereof. It should be noted that heat source 26 may also include other systems capable of heating the first region 20 to form glass barrier layer 28, such as $CO_2$ lasers and plasma torches. Preferably, glass barrier layer 28 is formed to a thickness within the range of between about 50 $\mu$m and about 100 $\mu$m.

Again, referring to FIG. 1, the method for manufacturing preform 10 next includes depositing second region 22 onto glass barrier layer 28 of first region 20. In the present example, soot 12 utilized to form second region 22 includes fluorine as a dopant therein. More preferably, second region 22 includes at least about 0.3 wt. % fluorine therein. However, second region 22 may include various dopants as listed above. The method next includes depositing the third region 24 of silica based soot onto second region 22. In the present example, third region 24 is preferably substantially free of the fluorine dopant. As illustrated in FIG. 2, the refractive index profile of an optical waveguide fiber resulting from preform 10 subsequent to the deposition of soot 12 to form third region 24 shows a decrease of $\Delta$ between first region 20 and second region 22, and a increase of $\Delta$ between second region 22 and third region 24. It should be noted that the profile as shown in FIG. 2 does not include any migration of fluorine into third region 24.

Figure 4:
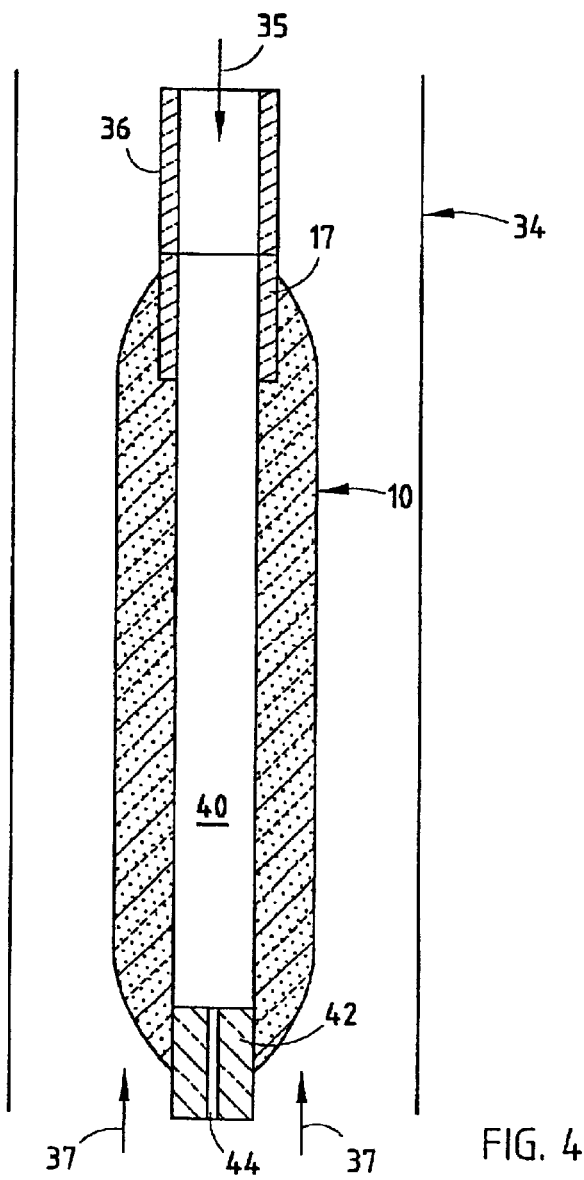
FIG. 4 is a cross-sectional schematic view of the preform located vertically within a sintering oven.

The soot preform 10 (FIG. 4) is then suspended in a sintering furnace 34. As illustrated in FIG. 4, a ball joint 36 is attached to handle 17. Perform 10 also includes a center passageway 40 from within which the starting member 16 is removed, and a plug 42 with an optional capillary tube 44. It should be noted that plug 42 and ball joint 36 are not required to practice the present invention.

In a preferred embodiment, soot preform 10 is heat treated in furnace 34 in an atmosphere preferably substantially devoid of any halide containing compound to a first temperature, after an optional drying step, wherein soot preform 12 is introduced to a drying agent, including, but not limited to, chlorine, germanium chloride, germanium tetrachloride, silicate tetrachloride, and combinations thereof. During the drying step, the drying agent is circulated about preform 10 by passing the drying agent through the center passageway 40 as indicated by a directional arrow 35, and about the exterior of preform 10 as indicated by directional arrows 37. Preferably, the atmosphere after drying comprises an inert atmosphere, such as an atmosphere of helium, argon, nitrogen, or mixtures thereof.

Initially, soot preform 10 is partially sintered by exposing the preform 10 to a first centering temperature. The first or partially sintering temperature comprises a temperature of within the range of from about 900° C. to about 1350° C. Preferably, the partial sintering temperature is above about 1240° C., more preferably above about 1280° C., and most preferably above about 1300° C. It is also preferred that the temperature is not above about 1350° C. Preferably, preform 10 is maintained at the first sintering temperature for at least about thirty (30) minutes, and more preferably at least about forty-five (45) minutes. It is further preferred that the heating step lasts for a sufficient period of time such that preform 10 reaches an isothermal temperature. Isothermal temperature as used herein describes a preform without a radial temperature gradient that is greater than about 5° C./cm, more preferably not greater than about 2° C./cm, and most preferably about 0° C./cm.

Figure 5:
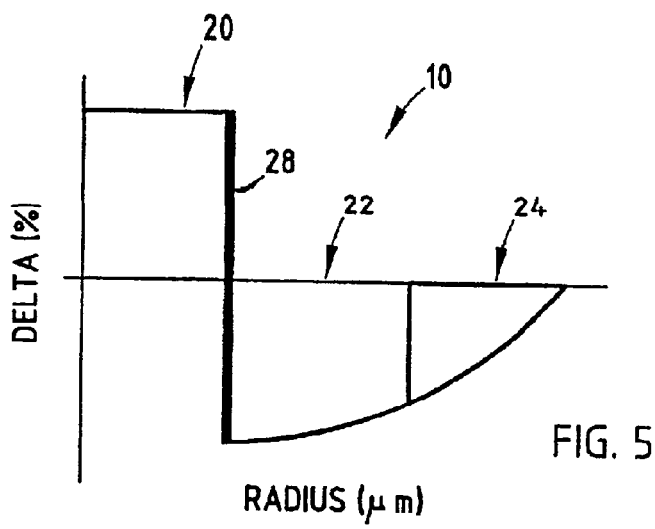
FIG. 5 is a diagram of an optical fiber refractive index profile constructed from a preform, which exhibits migration.

In the illustrated example, as the soot preform 10 is dried and partially sintered, germanium contained within first region 20 is prevented from migrating into second region 22 by glass barrier layer 28, while fluorine doped within second region 22 is prevented from migrating to within first region 20 by glass barrier layer 28. During the drying partially sintering steps, fluorine doped within second region 22 migrates into third region 24, thereby resulting in an approximate profile as shown in FIG. 5, that would be exhibited by an optical waveguide fiber drawn from soot preform 10 subsequent to the partial sintering step.

Figure 6:
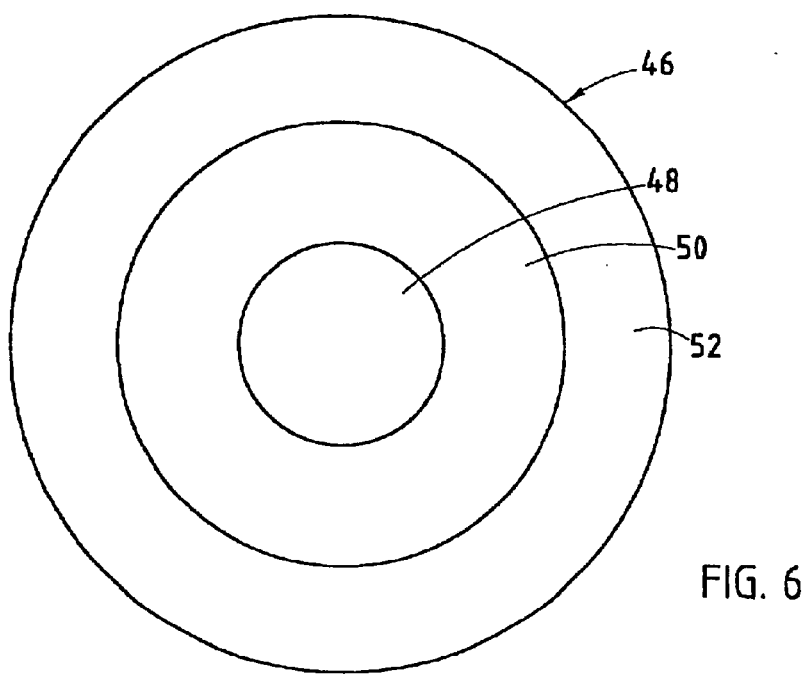
FIG. 6 is a cross-sectional schematic view of an optical waveguide fiber constructed from the preform.
Figure 7:
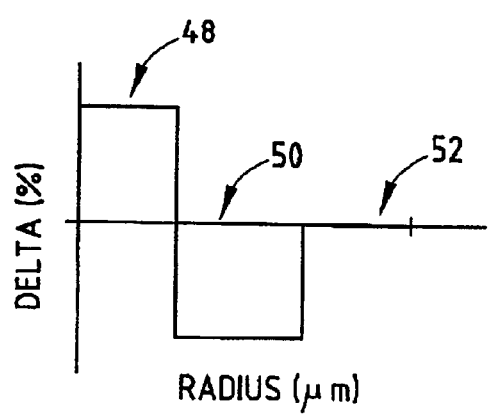
FIG. 7 is a diagram of an optical waveguide fiber refractive index profile of the optical fiber of FIG. 6.

The method next includes ramping the temperature within furnace 34 from the partially sintering temperature to a high or complete sintering temperature of around 1450° C., thereby completely sintering preform 10. During this final step, a stripping agent is introduced into furnace 34 that strips away the fluorine that has migrated from second region 22 to within third region 24. The stripping agent utilized to strip the unwanted dopant from within third region 24 of preform 10, which in the present example is fluorine, comprises a compound including an element selected from a group of VA and/or VIA in the periodic table of elements. Group VA and VIA elements form volatile compounds when reacted with fluorine, and can compete effectively with silicon for the fluorine on the basis of very high bond strengths with fluorine. For example, at 1500° K., the reaction:

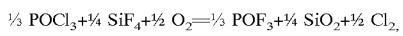
$$\tfrac{1}{3}\ POCl_3 + \tfrac{1}{4}\ SiF_4 + \tfrac{1}{2}\ O_2 = \tfrac{1}{3}\ POF_3 + \tfrac{1}{4}\ SiO_2 + \tfrac{1}{2}\ Cl_2,$$

has a $\Delta G$ of $-8.5$ Kcal per mole. The reaction to form $POF_3$ goes forward even while stripping fluorine from $SiF_4$. $\Delta G_f$ for species such as $SiO_{3/2}F$ are not readily available, but since the silicon oxyfluorides spontaneously decompose to $SiF_4$ and silica at temperatures above 1300° K., it is safe to say that $\Delta G_f(SiO_xF_y) > \Delta G_f(SiF_4)$ so that the reaction above describes an upper limit for the reaction energy for stripping fluorine from fluorinated silica. In the present example, the stripping agent preferably includes $POCl_3$. The approximate refractive index profile an optical waveguide fiber 46 (FIG. 6) resulting from preform 10 after being completely sintered is shown in FIG. 7. Fiber 46 includes a core region 48, a moat or first radial portion 22 surrounding core region 20, and an overclad or second radial portion 24 surrounding first radial portion 22, which correspond to first region 20, second region 22 and third region 24 of soot preform 10.

It should be noted that the partial sintering temperature utilized to partially sinter soot preform 10, the specific stripping agent, the complete sintering temperature used to completely center soot preform 10, as well as the associated dwell times may be chosen to optimize and control the "penetration depth" of the stripping agent into third region 24 of preform 10. The amount of the stripping agent used and the temperature at which the stripping agent is introduced is determined by the location of the moat-overclad interface. These parameters were chosen such that the stripping agent strips only the unwanted fluorine in the overclad and not from the moat. The stripping reaction takes place under conditions where the reaction and sintering rates are much faster than the diffusion rates such that the stripping agent is able to diffuse through only the overclad region of the blank.

It will become apparent to those skilled in the art that various modifications to the preferred embodiment of the invention as described herein can be made without departing from the spirit or scope of the invention as defined by the appended claims.

The invention claimed is:

1. A method of manufacturing an optical waveguide preform, comprising:
   forming a preform including a first portion having a glass barrier layer,
   forming a second portion on the glass barrier layer, the second portion including a dopant therein, and
   stripping nearly all the dopant from at least a section of the second portion during sintering thereby forming a moat wherein a refractive index of the section is greater than the moat.

2. The method of claim 1 wherein the dopant stripped from the section originated from dopant migration in a previous step.

3. The method of claim 1 wherein the dopant in the second portion comprises fluorine.

4. The method of claim 3 wherein the dopant in the second portion comprises an average weight percent of at least 0.3% fluorine substantially throughout the second portion prior to the step of stripping.

5. The method of claim 4 wherein the step of stripping is accomplished by a stripping agent.

6. The method of claim 5 wherein the stripping agent comprises a compound including an element selected from a group consisting of VA and VIA in the periodic table of elements.

7. The method of claim 6 wherein the stripping agent is selected from a group including phosphorous oxychloride, phosphorous trichloride, sulfur oxychloride, antimony, arsenic, chlorides and oxychlorides.

8. The method of claim 7 wherein the step of forming the preform body includes doping the first portion with germanium.

9. The method of claim 8, further including:
   applying heat to the first portion prior to forming the second portion, thereby causing at least a portion of the first portion to have a greater density than the second portion.

10. The method of claim 9 wherein the heat applying step includes heating the first portion with a flame generated utilizing at least one fuel selected from a group including oxygen, methane and oxygen, carbon monoxide and oxygen, deuterium, and hydrogen.

11. The method of claim 9 wherein the heat applying step includes heating the first portion with a $CO_2$ laser.

12. The method of claim 9 wherein the heat applying step includes heating the first portion with a plasma torch.

13. The method of claim 9 wherein the heat applying step is accomplished within the range of from about 1500° C. to about 1700° C.

14. The method of claim 9 further including:
   drying the first and second portions with a drying agent.

15. The method of claim 14 wherein the drying step includes selecting the drying agent from a group including chlorine, germanium chloride, germanium tetrachloride, silicon tetrachloride, and combinations thereof.

16. The method of claim 14 further including:
   partially sintering the first and second portions prior to the stripping step.

17. The method of claim 1 wherein the step of stripping is accomplished by a stripping agent that includes an element selected from a group consisting of VA and VIA in the periodic table of elements.

18. The method of claim 1, wherein the step of forming the preform body includes doping the first portion with germanium.

19. The method of claim 1, further including:
   applying heat to the first portion prior to forming the second portion, thereby causing at least a portion of the first portion to have a greater density than the second portion.

20. The method of claim 19, wherein the heat applying step includes forming the glass barrier layer between the first portion and the second portion.

21. The method of claim 20, further including:
   drying the first and second portions with a drying agent.

22. The method of claim 21, further including:
   partially sintering the first and second portions prior to the stripping step.

23. The method of claim 1 wherein the step of stripping includes stripping substantially all migrated dopant from an outer section of the second portion.

24. A method of manufacturing an optical fiber preform, comprising:

forming a preform including a moat having a refractive index less than cladding and radial portion abutting the moat, wherein the moat and the radial portion include a fluorine dopant;

at least partially sintering the moat; and stripping substantially all the fluorine dopant from the radial portion such that a refractive index of the radial portion is greater than that of the moat.

25. The method of claim 24 wherein the step of stripping is accomplished by a stripping agent.

26. The method of claim 25 wherein the stripping agent comprises a compound including an element selected from a group including VA and VIA in the periodic table of elements.

27. The method of claim 26 wherein the stripping agent includes selecting the stripping agent from a group including phosphorous oxychloride, phosphorous trichloride, sulfur oxychloride, antimony, arsenic, chlorides and oxychlorides.

28. The method of claim 27 wherein the preform forming step includes forming the preform to include a core region surrounded by the moat.

29. The method of claim 28, further including:

applying heat to the core region prior to forming the moat, thereby causing the core region to have at least a portion exhibiting a greater density than the moat.

30. The method of claim 29 wherein the heat applying step includes heating the core region with a flame generated utilizing at least one fuel selected from a group including oxygen, methane and oxygen, carbon monoxide and oxygen, deuterium, and hydrogen.

31. The method of claim 29 wherein the heat applying step includes heating the core region with a $CO_2$ laser.

32. The method of claim 29 wherein the heat applying step includes heating the core region with a plasma torch.

33. The method of claim 29 wherein the heat applying step includes forming a glass barrier between the core region and the moat.

34. The method of claim 29, further including:

drying the preform body with a drying agent.

35. The method of claim 34 wherein the drying step includes selecting the drying agent from a group including chlorine, germanium chloride, germanium tetrachloride, silicate tetrachloride, and combinations thereof.

36. The method of claim 29, further including:

partially sintering the preform prior to the stripping step.

37. The method of claim 24 wherein the step of stripping is accomplished by a stripping agent comprising a compound including an element selected from a group including VA and VIA in the periodic table of elements.

38. The method of claim 24 wherein the preform body forming step includes forming the preform body to include a core region surrounded by the moat.

39. The method of claim 38, further including:

applying heat to the core region prior to forming the moat, thereby causing the core region to have at least a portion exhibiting a greater density than the moat.

40. The method of claim 39, further including:

drying the preform body with a drying agent.

41. The method of claim 40, further including:

partially sintering the preform body prior to the stripping step.

42. The method of claim 24 wherein the dopant in the radial portion is provided as a result of migration of the dopant from the moat.

43. A method of manufacturing an optical waveguide preform, comprising:

forming a preform including a first portion and a second portion, the second portion including a fluorine dopant therein, and wherein the first portion exhibits a barrier layer having a density greater than the second portion; and stripping nearly all the dopant from at least a section of the second portion wherein the step of stripping is accomplished by a stripping agent comprising a compound including an element selected from a group consisting of VA and VIA in the periodic table of elements such that a refractive index of the section is greater than the second portion.

* * * * *